US011925587B2

(12) United States Patent
Denk et al.

(10) Patent No.: US 11,925,587 B2
(45) Date of Patent: Mar. 12, 2024

(54) REMOVABLE CUSTOMIZABLE CASKET PANEL

(71) Applicant: MATTHEWS INTERNATIONAL CORPORATION, Pittsburgh, PA (US)

(72) Inventors: Michelle Helena Denk, Sewickley, PA (US); Yves Joseph Allard, Hellam, PA (US); Ronald C. George, Richmond, IN (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 17/497,239

(22) Filed: Oct. 8, 2021

(65) Prior Publication Data

US 2022/0218549 A1 Jul. 14, 2022

Related U.S. Application Data

(63) Continuation of application No. 16/659,010, filed on Oct. 21, 2019, now Pat. No. 11,141,340, which is a
(Continued)

(51) Int. Cl.
*A61G 17/04* (2006.01)
*A61G 17/02* (2006.01)
(Continued)

(52) U.S. Cl.
CPC ............ *A61G 17/042* (2016.11); *A61G 17/02* (2013.01); *A61G 17/04* (2013.01); *A61G 99/00* (2013.01); *G09F 15/0012* (2013.01); *G09F 15/0018* (2013.01); *G09F 15/005* (2013.01); *A47G 1/06* (2013.01)

(58) Field of Classification Search
CPC ...... A61G 17/04; A61G 17/042; A61G 17/02; A61G 99/00; A47G 1/06; A47G 1/0616; G09F 15/0012; G09F 15/0018; G09F 15/005; G09F 3/20; G09F 1/12
USPC ...... 27/2, 4, 14, 19; 40/606.03, 606.08, 725, 40/727, 657, 798, 799
See application file for complete search history.

(56) References Cited

U.S. PATENT DOCUMENTS 3,965,599 A * 6/1976 Ebner ........................ G09F 7/04 40/711
4,357,741 A * 11/1982 Winburn .............. A61G 17/042 27/19

(Continued)

*Primary Examiner* — William L Miller
(74) *Attorney, Agent, or Firm* — DLA Piper LLP

(57) ABSTRACT

Caskets, cap panel assemblies for a casket, and methods for manufacturing cap panel assemblies are described. A casket may include a casket shell, at least one casket cap pivotally mounted on the casket shell, and a cap panel assembly mounted in the at least one casket cap. The cap panel assembly may include a cap panel, a puffing member attached to each edge of the cap panel, a cap panel insert positioned in-line with the cap panel, and a plurality of resilient members positioned on a front face of the cap panel insert. The plurality of resilient members may be tensioned, for example, to hold keepsakes, memorabilia, or other types of objects on or in the cap panel insert. The cap panel insert can include a mounting bracket or a screw and wire assembly for mounting the cap panel insert on a wall.

11 Claims, 7 Drawing Sheets

Related U.S. Application Data continuation of application No. 15/812,778, filed on Nov. 14, 2017, now Pat. No. 10,449,103, which is a continuation of application No. 15/050,340, filed on Feb. 22, 2016, now Pat. No. 9,833,372, which is a continuation of application No. 14/334,893, filed on Jul. 18, 2014, now Pat. No. 9,265,683.

(60) Provisional application No. 61/847,756, filed on Jul. 18, 2013.

(51) Int. Cl.

| | |
|---|---|
| ***A61G 99/00*** | (2006.01) |
| ***G09F 15/00*** | (2006.01) |
| *A47G 1/06* | (2006.01) |

(56) References Cited

U.S. PATENT DOCUMENTS

| | | | | |
|---|---|---|---|---|
| 4,905,821 | A * | 3/1990 | Corbett | A47G 1/12 211/85.2 |
| 5,495,648 | A * | 3/1996 | Rojdev | A61G 17/028 27/19 |
| 5,675,877 | A * | 10/1997 | Lewis | A61G 17/04 27/14 |
| 5,709,016 | A * | 1/1998 | Gulick | A61G 17/004 27/14 |
| 6,237,202 | B1 * | 5/2001 | Agee | A61G 17/04 27/14 |
| 6,715,190 | B2 * | 4/2004 | Groemminger | A61G 17/04 27/14 |
| 6,742,231 | B1 * | 6/2004 | Calhoun | A61G 17/04 27/14 |
| 7,007,421 | B2 * | 3/2006 | Kirschhoffer | G09F 3/20 40/658 |
| 7,159,287 | B2 * | 1/2007 | Parker | A61G 17/04 27/19 |
| 7,478,462 | B2 * | 1/2009 | Robert | A61G 17/04 27/19 |
| 7,584,529 | B1 * | 9/2009 | Parker | A61G 17/02 27/14 |
| 8,307,519 | B2 * | 11/2012 | Drew | A61G 17/04 27/14 |
| 8,667,653 | B2 * | 3/2014 | Drew | A61G 17/0106 27/14 |
| 9,224,315 | B2 * | 12/2015 | Donat | G09F 15/0012 |
| 9,265,682 | B2 * | 2/2016 | Denk | G09F 15/0012 |
| 9,763,845 | B2 * | 9/2017 | Denk | G09F 15/0018 |
| 10,258,528 | B2 * | 4/2019 | Denk | A61G 17/04 |
| 11,050,970 | B1 * | 6/2021 | Martin | H04N 5/775 |
| 11,160,713 | B2 * | 11/2021 | Denk | A61G 17/04 |
| 11,737,944 | B2 * | 8/2023 | Denk | A61G 99/00 27/19 |
| 2004/0158960 | A1 * | 8/2004 | Shaw | A61G 17/0136 27/14 |
| 2005/0150091 | A1 * | 7/2005 | Parker | A61G 17/04 27/19 |
| 2007/0044287 | A1 * | 3/2007 | Parker | A61G 17/04 27/14 |
| 2007/0124978 | A1 * | 6/2007 | Donat | G09F 1/12 40/798 |
| 2008/0086855 | A1 * | 4/2008 | Maple | A61G 17/04 27/19 |
| 2010/0132172 | A1 * | 6/2010 | Parker | A61G 17/045 27/14 |
| 2010/0299895 | A1 * | 12/2010 | Burlage | A61G 17/04 27/14 |
| 2013/0074299 | A1 * | 3/2013 | Rojdev | G09F 7/04 27/14 |
| 2013/0191239 | A1 * | 7/2013 | Bovard | A61G 17/00 705/330 |
| 2014/0026377 | A1 * | 1/2014 | Rojdev | A61G 17/04 27/3 |
| 2014/0259575 | A1 * | 9/2014 | Skeen | A61G 17/04 27/14 |

* cited by examiner

REMOVABLE CUSTOMIZABLE CASKET PANEL

CROSS REFERENCE TO RELATED APPLICATIONS

This application is a continuation of U.S. application Ser. No. 16/659,010, filed on Oct. 21, 2019, issued as U.S. Pat. No. 11,141,340, which is a continuation of U.S. application Ser. No. 15/812,778, filed on Nov. 14, 2017, issued as U.S. Pat. No. 10,449,103, which is a continuation of U.S. application Ser. No. 15/050,340, filed on Feb. 22, 2016, issued as U.S. Pat. No. 9,833,372, which is a continuation of U.S. application Ser. No. 14/334,893, filed on Jul. 18, 2014, issued as U.S. Pat. No. 9,265,683, which claims the benefit of U.S. Provisional Application No. 61/847,756 titled "Customizable Casket Panel," filed on Jul. 18, 2013, the contents of which are incorporated by reference in their entirety as if fully set forth herein.

TECHNICAL FIELD

This invention generally relates to caskets, and more particularly, to casket panel assemblies for casket caps or lids.

BACKGROUND

It is a common wish among family members and friends to display personal items and memorabilia of a deceased loved one during a funeral viewing. These items help family members and friends to remember the deceased and provide special memories. A typical option for displaying personal items includes using a poster board and easel to display pictures of the deceased. However, this option fails to allow a family member or friend to display items that are too big or that cannot be attached to the poster board. Items such as a favorite hat or book could not be properly mounted on the poster board, leaving the family members with no place to display these items of the deceased.

Caskets traditionally comprise a shell to which a cap or lid is pivotally attached thereto. During a viewing of the deceased individual in the casket, the cap is left open to allow relatives, loved ones, and acquaintances to view the deceased and pay their respects. As such, the under surface of the casket cap and any cap panel assembly arranged therein is visible.

Traditional cap panel assemblies include a rectangular cap panel, with a puffing member being attached to each side of the cap panel. The cap panel is positioned in the casket cap atop a ridge or groove on a bottom peripheral edge of the casket cap. The puffing members are positioned in peripheral edges along the casket cap. A rectangular cap panel insert, which may include decorative embroidery, pictures, or the like, is installed in between the puffing members and on an outside surface of the cap panel. Traditionally, the cap panel insert has been press fit into this position, establishing a friction between the puffing members, to allow the cap panel insert to remain in place. However, this technique has not always been the most reliable, because the cap panel is not able to support much weight. As a result, the cap panel insert often falls out of the cap panel assembly after the casket has been shaken or moved.

An additional method of installing the cap panel insert into the cap panel assembly includes the use of straps attached to a back surface of the cap panel insert. The straps are positioned along the length of the cap panel insert and are fastened to the cap panel insert near the lower ends of the strap. The straps are longer than the height of the cap panel insert, thereby extending over the top and bottom edges of the cap panel insert. During installation of the cap panel insert, an installer inserts the bottom strap portions between the cap panel and the puffing member by angling the cap panel insert outwards towards the installer. The cap panel insert is flexible enough to allow the installer to bow the cap panel insert, thereby inserting the top edge of the cap panel insert into the top edge of the cap panel and puffing member. Because the cap panel insert needs flexibility in order to be inserted, both the top and bottom straps cannot be fastened to the cap panel insert at the same time.

Accordingly, there is a need for a cap panel assembly that allows families to decorate with memorabilia that reflects the deceased and that can also be easily removed and installed and more securely mounted in a cap panel assembly.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cap panel assembly for a casket may include a cap panel insert configured to be coupled to at least a portion of the casket and a plurality of resilient members arranged on an exposed surface of the cap panel insert, the plurality of resilient members being tensioned to support at least one display element on the cap panel insert.

In an embodiment, a casket configured to provide for the presentation of display elements may include a cap panel insert coupled to the casket and a plurality of resilient members arranged on an exposed surface of the cap panel insert, the plurality of resilient members being tensioned to support at least one display element on the cap panel insert.

In an embodiment, a method of manufacturing a cap panel assembly for a casket may include providing a cap panel insert configured to be removably arranged within the casket and arranging a plurality of resilient members on an exposed surface of the cap panel insert, the plurality of resilient members being tensioned to support at least one display element on the cap panel insert.

In an embodiment, a cap panel assembly for a casket cap may include a cap panel, a puffing member attached to each edge of the cap panel, a cap panel insert positioned in-line with the cap panel, and a plurality of resilient members positioned on a front face of the cap panel insert. In general, the front face of the cap panel insert may include the exposed surface of the cap panel when installed in the cap pane. The plurality of resilient members may be tensioned, for example, to hold keepsakes, memorabilia, or other types of objects on or in the cap panel insert. The cap panel may include a frame, fabric, filler, and a backing board. The plurality of resilient members may be formed as elastic or (elastic or non-elastic) ribbon-shaped straps. The elastic or ribbon-shaped straps may be positioned in a lattice-type or grid-like arrangement. In some embodiments, the cap panel insert may be removably fastened to the cap panel using various fasteners. A non-limiting example of a fastener is a pin, such as a hat pin, a push pin, or flat-headed pins. In some embodiments, the cap panel insert may be permanently or semi-permanently installed within the cap panel assembly using methods known to those having ordinary skill in the art, such as adhesives, staples, sewing methods, or the like. In some embodiments, the cap panel insert may be removably installed in the cap panel assembly via a press-fit or friction-fit. The cap panel insert may include various mounting elements, such as a mounting bracket, frame, and/or a screw and wire assembly for mounting the cap panel insert on a wall.

In an embodiment, a casket may include a casket shell, at least one casket cap pivotally mounted on the casket shell, and a cap panel assembly mounted in the casket cap. The cap panel assembly may include a cap panel, a puffing member attached to each edge of the cap panel, a cap panel insert positioned in-line (e.g., parallel or substantially parallel) with the cap panel, and a plurality of resilient members positioned on a front face of the cap panel insert. The plurality of resilient members may be tensioned, for example, to hold keepsakes, memorabilia, or other types of objects on or in the cap panel insert. The cap panel may include a frame, fabric, filler, and a backing board. The plurality of resilient members may be formed as elastic or (elastic or non-elastic) ribbon-shaped straps. The elastic or ribbon-shaped straps may be positioned in a lattice-type or grid-like arrangement. In some embodiments, the cap panel insert may be removably fastened to the cap panel using various fasteners. A non-limiting example of a fastener is a pin, such as a hat pin, a push pin, or flat-headed pins. In some embodiments, the cap panel insert may be permanently or semi-permanently installed within the cap panel assembly using methods known to those having ordinary skill in the art, such as adhesives, staples, sewing methods, or the like. In some embodiments, the cap panel insert may be removably installed in the cap panel assembly via a press-fit or friction-fit. The cap panel assembly may be bubble-wrapped and stored in the casket shell while being transported from a distribution center to a destination location.

DETAILED DESCRIPTION

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

Figure 1:
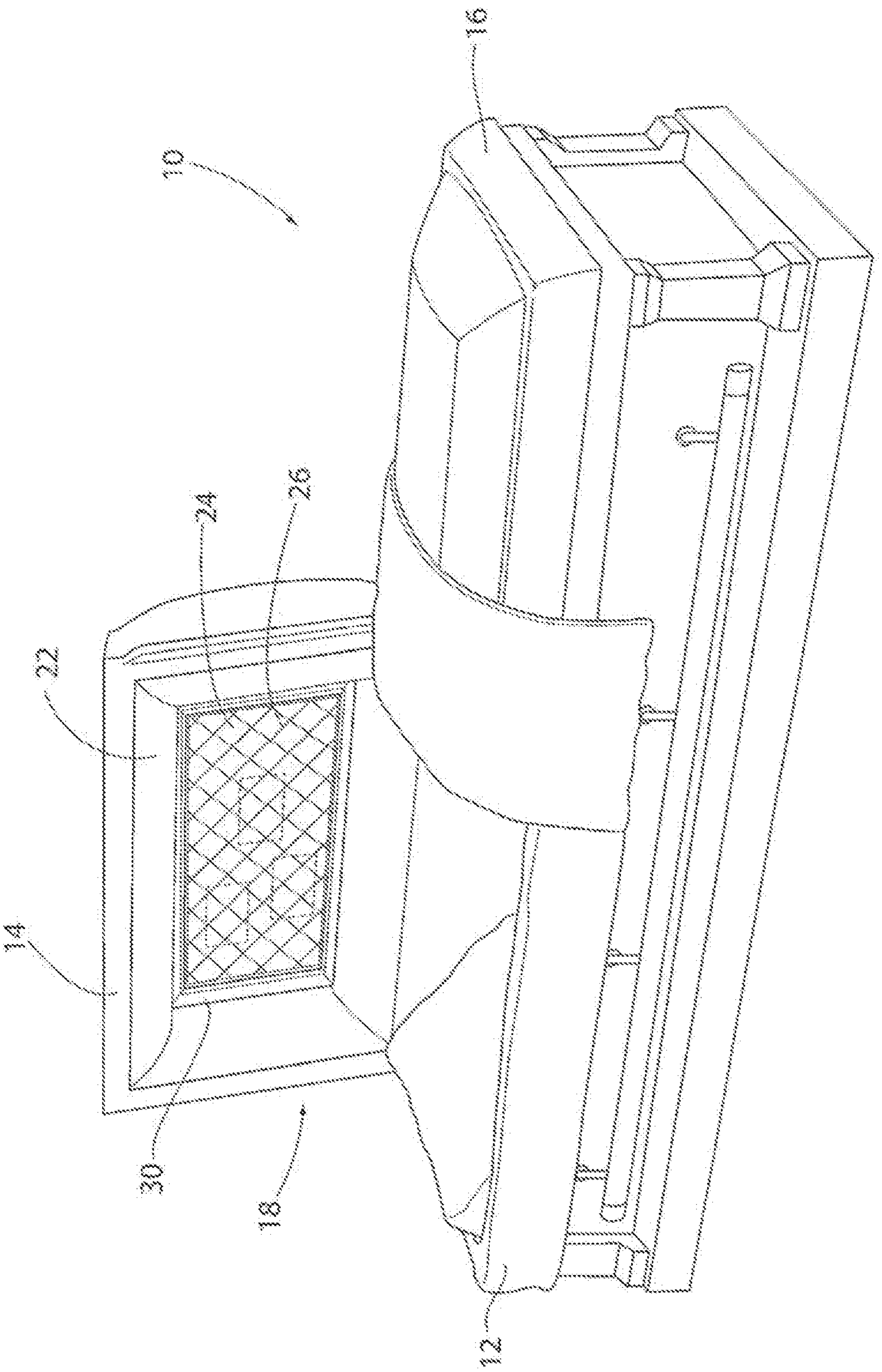
FIG. 1 depicts is a perspective view of an illustrative casket and a cap panel assembly according to some embodiments.

FIG. 1 depicts an illustrative casket with a cap panel assembly configured according to some embodiments. As shown in FIG. 1, a casket 10 with a cap panel assembly 18 is described herein. The casket 10 may include a shell 12 with a rectangular or substantially rectangular shape. One or more caps or lids 14, 16 may be pivotally attached to the shell 12. The caps 14, 16 may be pivotally attached to the shell 12 by hinges and/or structures configured to provide a pivotable and/or rotatable attachment to a surface as known by those having ordinary skill in the art. The casket 10 may include two caps, for example, a head end cap 14 and a foot end cap 16. In some embodiments, the casket 10 may include one continuous cap that extends the full longitudinal length of the shell. Each cap 14, 16 may include a cap panel assembly 18 mounted on an interior surface of each cap.

Figure 2:
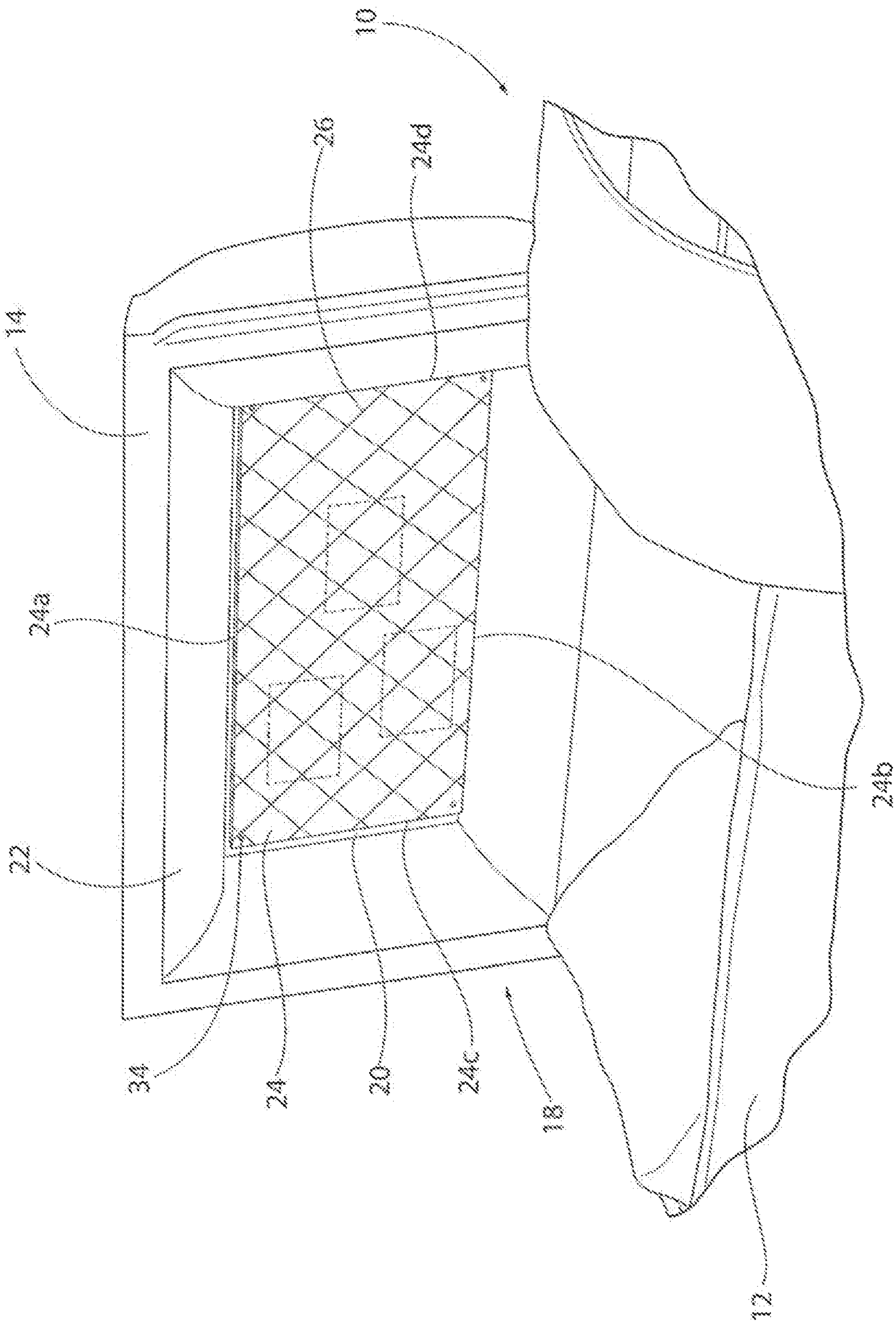
FIG. 2 depicts an isolated view of an illustrative cap panel according to some embodiments.

FIG. 2 depicts an isolated view of an illustrative cap panel according to some embodiments. As shown in FIG. 2, the cap panel assembly 18 may include a cap panel 20. The cap panel 20 may be designed to correspond to the shape of the cap 14. As shown in at least FIGS. 1 and 2, the cap panel 20 may have a rectangular or substantially rectangular shape. However, the cap panel 20 may have any geometric shape or size capable of operating according to some embodiments. A puffing member 22 may be attached to each edge of the cap panel 20, for example, by stapling, nailing, or otherwise affixing the puffing member to the edges of the cap panel.

The cap panel assembly 18 may also include a removable cap panel insert 24. The cap panel insert 24 may be configured to correspond or substantially correspond to the shape of the cap 14. As shown in FIG. 3A-FIG. 6, the cap panel insert 24 may have a rectangular or substantially rectangular shape. In some embodiments, the cap panel insert 24 may be the same or substantially the same size as the cap panel 20. However, the cap panel insert 24 may have any geometric shape or size capable of operating according to some embodiments. In some embodiments, the cap panel insert 24 may have two opposing long sides 24*a*, 24*b* and two opposing short sides 24*c*, 24*d*. The cap panel insert 24 may include several components including, without limitation, a frame 30, fabric material 40, filler material 42, and a backing board 44. The fabric material 40 may include any material capable of being fastened to the backing board 44, including, but not limited to cloth, linen, paper, and any combination thereof. The filler material 42 may include any material capable of adding body and/or depth to the cap panel insert 24, including, without limitation, fiber, cotton, or a combination thereof. The backing board 44 may be formed of various materials, including rigid materials such as wood, plastic, metal, any combination thereof, or the like.

The cap panel insert 24 may also include a plurality of elastic straps 26 that may be positioned in various arrangements on an exterior side of the cap panel insert, including, without limitation, a lattice-type arrangement, a grid-like pattern, or any other arrangement or combination of arrangements that permit an individual to secure items to the cap panel insert. The elastic straps 26 allow a user to place cards, photographs, memorabilia, or any other personal or commemorative items ("display elements") on the cap panel insert 24. The elastic straps 26 may be pulled tight, stretched, strained, or otherwise made taut or semi-taut across the cap panel insert 24, thereby creating tension, at least along one axis of the elastic straps (for example, the longitudinal axis).

By pulling the elastic straps 26 away from the cap panel insert 24, an individual may place the item against the cap panel insert. After the item has been positioned, the elastic straps 26 may be released, forcing the elastic straps back into their original position. In some embodiments, the straps 26 may be shaped to provide aesthetic appeal to the cap panel insert 24, such as ribbon-shaped or substantially ribbon shaped straps or other aesthetic designs capable of operating according to some embodiments.

As shown in FIG. 2, the cap panel insert 24 may be mounted in or coupled to the cap 14 using fasteners 32. The fasteners 32 may extend an appropriate length to ensure that all the components of the cap panel insert 24 may be attached to the cap 14. The fasteners 32 may be screws, hat pins, push pins, flat-headed pins, or any fastener capable of temporarily or semi-permanently retaining the cap panel insert 24 within the cap 14. In some embodiments, the cap panel insert 24 may be mounted in or coupled to the cap 14 via a friction-fit or press-fit configuration. In this manner, the cap panel insert 14 may be removed from the casket without having to damage the cap panel insert 24 or any portion of the casket 10 or requiring the removal of any portion of the casket. In some embodiments, the cap panel insert 24 may be permanently or semi-permanently positioned in the cap panel assembly 18 such that, for example, the cap panel insert 24 may not be removed without damaging, tarnishing, or otherwise negatively affecting at least a portion of the cap panel insert 24 or portion of the casket 10.

In some embodiments, the cap panel insert 24 may be permanently attached to the casket 10, for instance, within the cap 14. In such embodiments, the cap panel insert 24 may not be removed from the casket without damage to the cap panel insert and/or portions of the casket.

Although the cap panel insert 24 may be coupled to the cap 14 using fasteners, embodiments are not so limited, as the cap panel insert may be coupled to or hung from any portion of the casket 10 using any method or element capable of operating according to some embodiments. For instance, the cap panel insert 24 may be temporarily or semi-permanently coupled to a portion of the casket by arranging at least a portion of the cap panel insert against a portion of the casket 10 configured to hold the cap panel insert in place within the casket. For example, a portion of the casket 10, for example, within the cap 14, may include at least one pocket-type ridge capable of receiving at least a portion of the cap panel insert 24, for example, at least a portion of the outer edge of the cap panel insert and supporting the cap panel insert within the casket.

Figure 4:
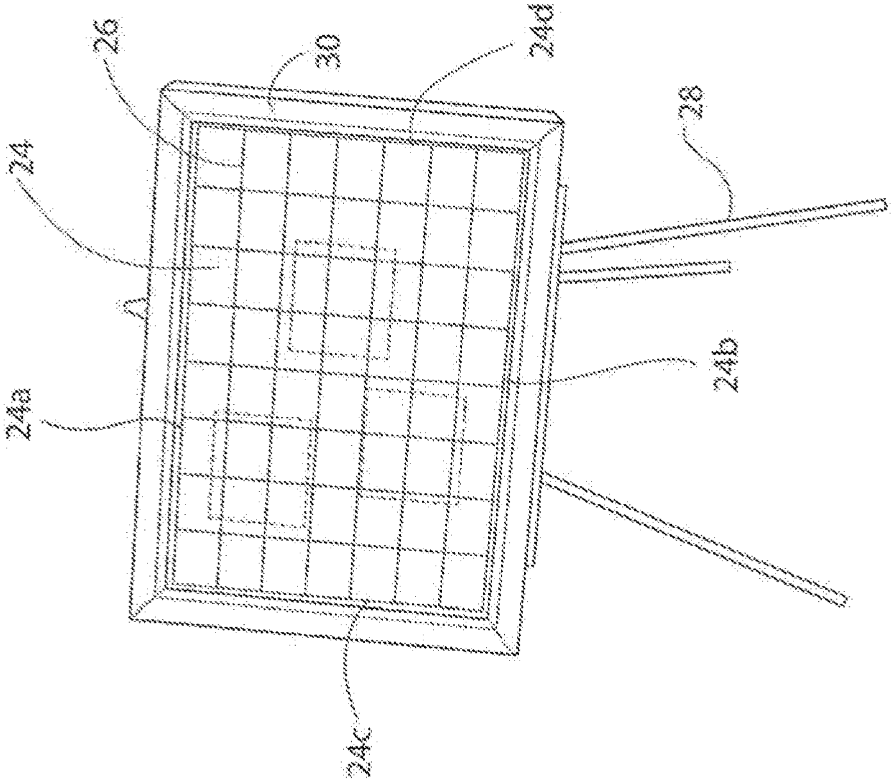
FIG. 4 depicts an illustrative cap panel insert according to some embodiments.
Figure 3A:
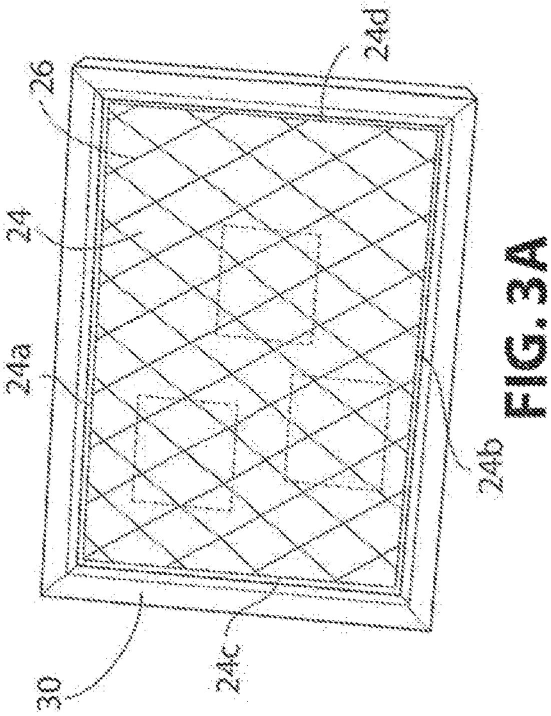
FIG. 3A depicts an illustrative cap panel insert according to some embodiments.
Figure 3B:
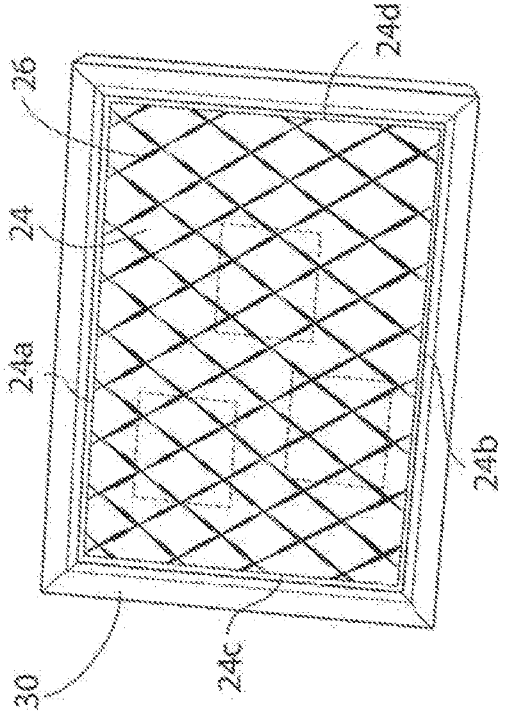
FIG. 3B depicts an illustrative cap panel insert according to some embodiments.
Figure 5:
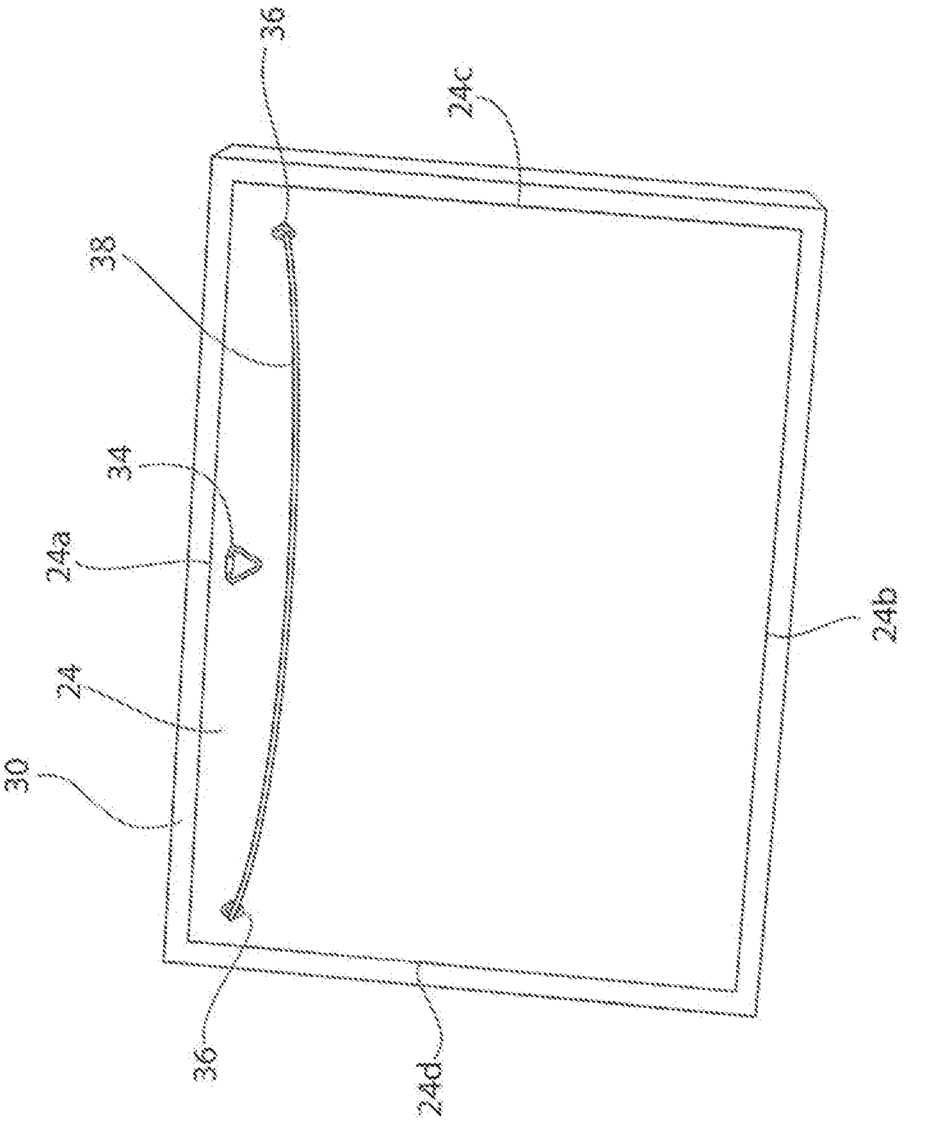
FIG. 5 depicts a back view of an illustrative cap panel insert according to some embodiments.
Figure 6:
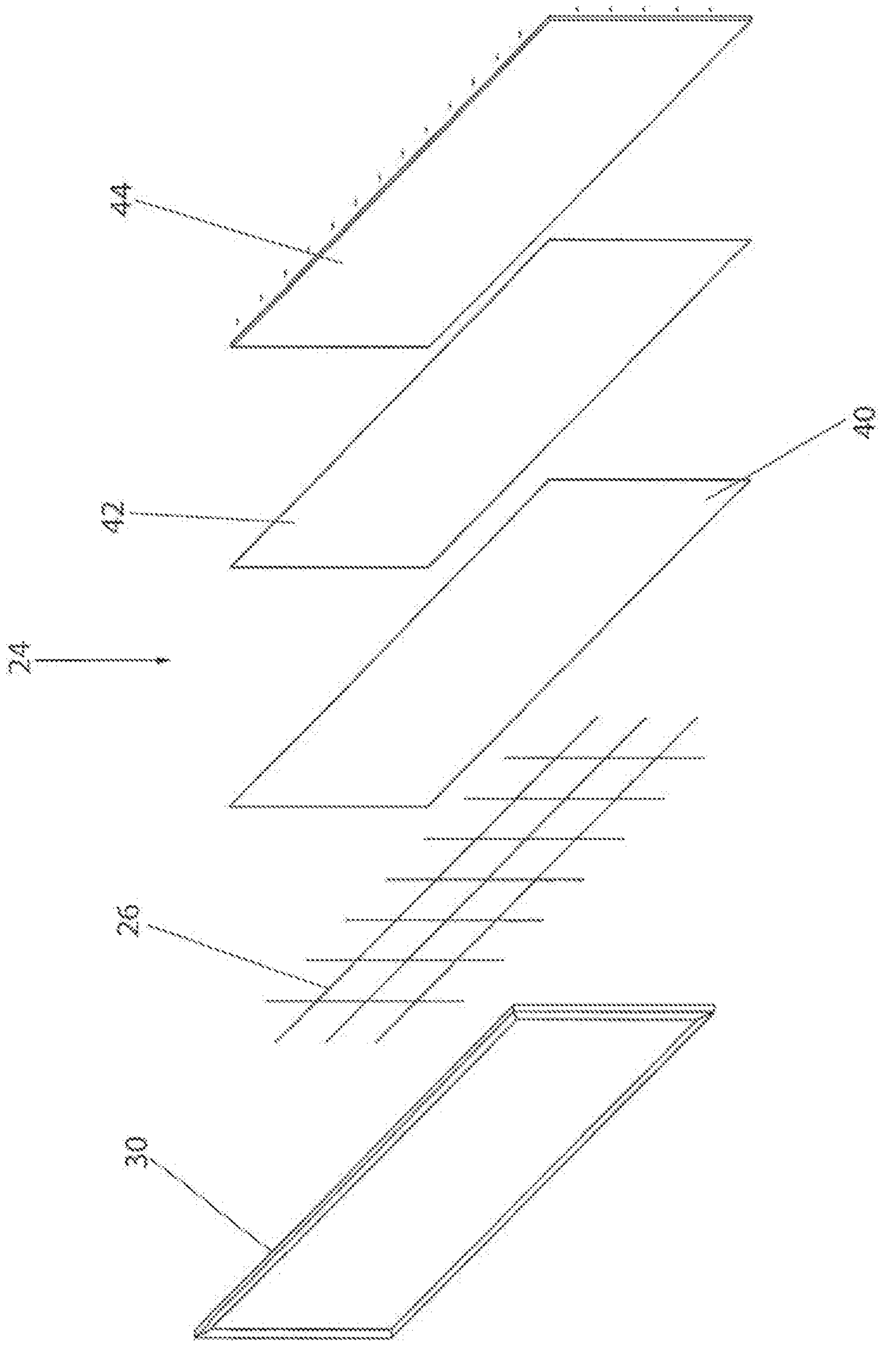
FIG. 6 depicts a perspective view of an illustrative cap panel insert according to some embodiments.
Figure 9:
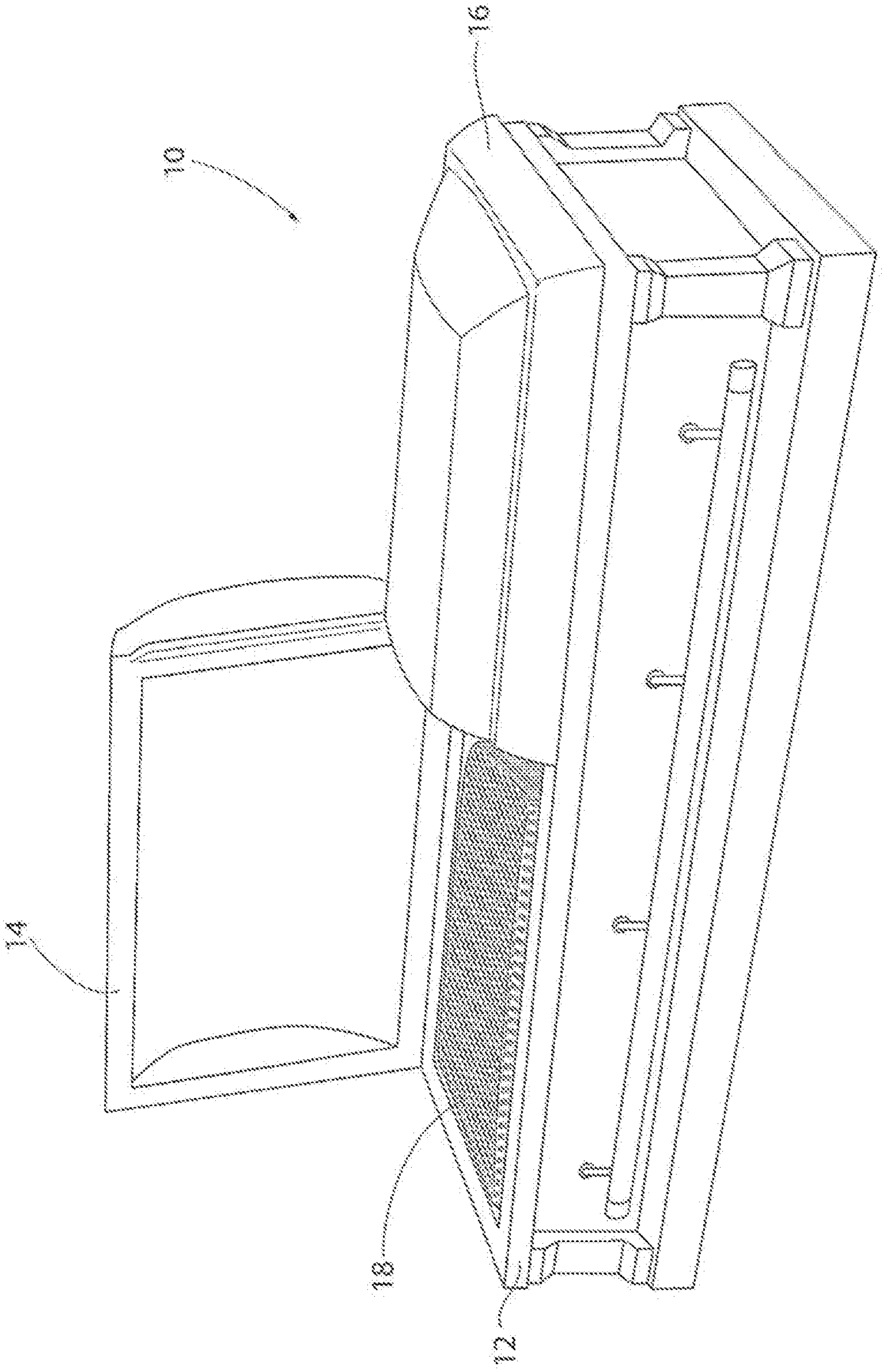
FIG. 9 depicts an isolated view of casket having an illustrative cap panel assembly configured to transport according to some embodiments.

The cap panel insert 24 may be bubble-wrapped using pins, staples, or tape, and placed in the shell 12 along with detailed marketing and installation instructions (see FIG. 9). The casket 10 may be transported from the distribution center to the individual, organization, or company that has purchased the casket. This assembly may be provided to allow a grieving family or friend to take home the cap panel insert 24 from the funeral home and display it at their home in remembrance of the deceased. As shown in FIGS. 4-5, the cap panel insert 24 may be removed from the casket 10 and, for example, inserted into a frame 30, which may be placed on an easel 28 or mounted on a wall. The cap panel insert 24 may include mounting elements configured to allow the cap panel insert to be mounted to a surface. As shown in FIG. 5, the cap panel insert 24 may include a mounting bracket 34 on the back surface of the cap panel insert. The cap panel insert 24 may also include "eye-screws" 36 and a wire 38 connected to the "eye-screws" to mount the cap panel insert on the wall.

Figure 7:
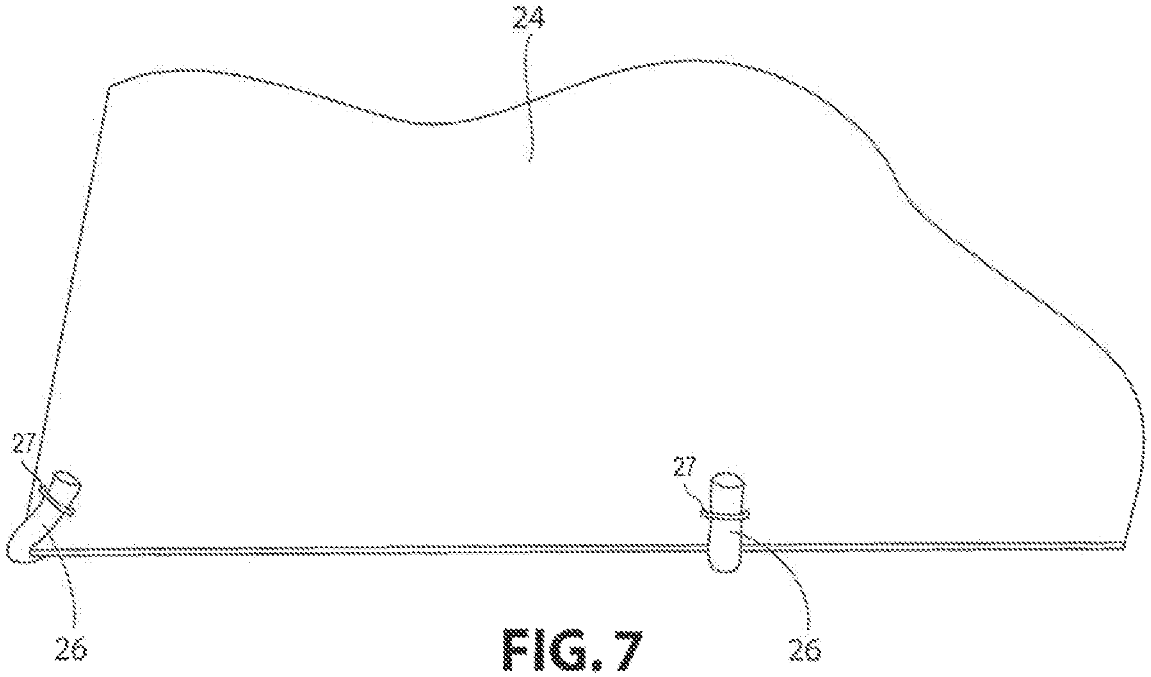
FIGS. 7 and 8 depict a back side and a front side of a cap panel insert, respectively, according to some embodiments.
Figure 8:
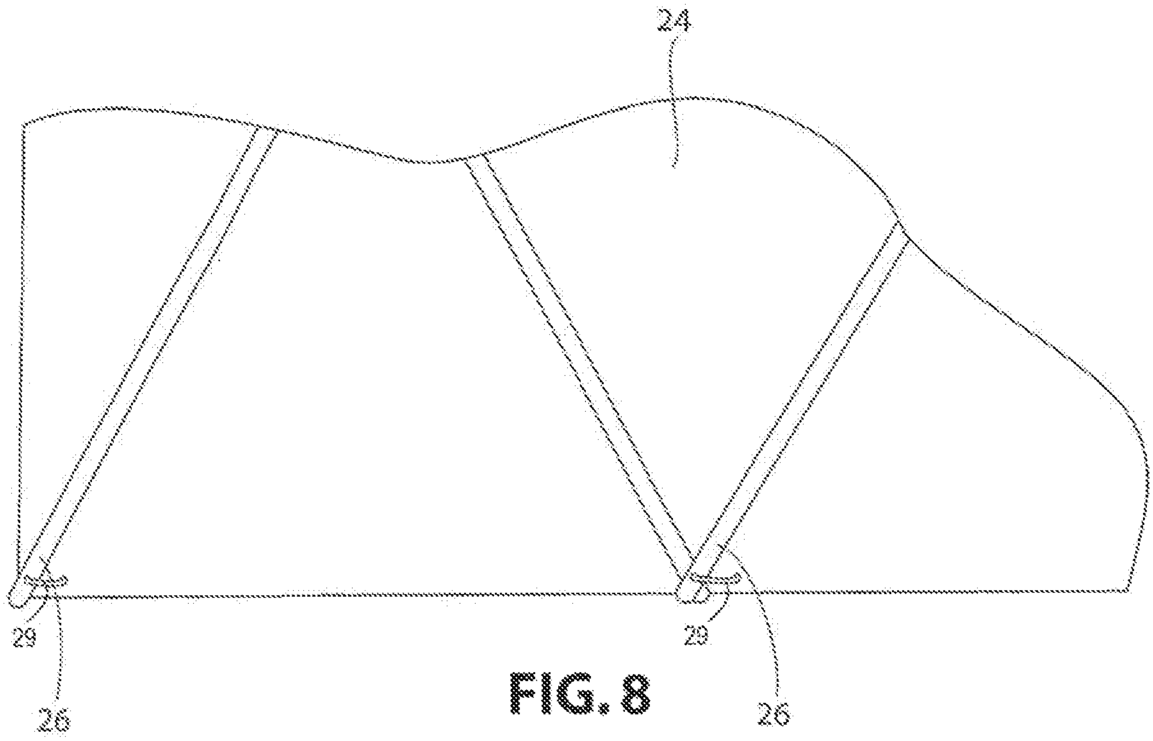

FIGS. 7 and 8 depict a back side and a front side of a cap panel insert, respectively, according to some embodiments. As shown in FIGS. 7, the ends of the elastic straps 26 may be affixed to a back side of the cap panel insert 24 using a fastening element 27. As depicted in FIG. 8, the ends of the elastic straps 26 may be affixed to a front side of the cap panel insert 24 using a fastening element 29. Non-limiting examples of fastening elements 27, 29 may include staples, tape, adhesives, glue, nails, tacks, pins, or the like. In some embodiments, only one fastening element 27, 29 may be used to affix the straps 26 to the cap panel insert 24. For instance, the straps 26 may be affixed to the cap panel insert 24 by affixing the straps to the back side of the cap panel insert or vice versa.

A user may make space for placing an object between the straps 26 and the front surface of the cap panel insert 24 by pulling the elastic straps away from the front surface of the cap panel insert. After the item is correctly positioned, the straps 26 may be placed (or "snapped") back into position, holding the object against the front surface of the cap panel insert 24.

FIG. 9 depicts an isolated view of casket having an illustrative cap panel assembly configured to transport according to some embodiments. As shown in FIG. 9, the cap panel assembly 18 may be encased in a packaging material, such as bubble wrap, using adhesives or fasteners according to some embodiments, such as pins, staples, or tape. The packaged cap panel assembly 18 may be placed in the shell 12 along with, for example, detailed marketing and installation instructions. This assembly may be provided to allow a grieving family or friend to take home the cap panel insert 24 from the funeral home and display it at their home in remembrance of the deceased.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of manufacturing a cap panel assembly for a casket, comprising:

providing a cap panel insert configured to be removably coupled and arranged within the casket; and arranging a plurality of elongate members arranged in an intersecting pattern on a first exposed surface of a cap of the casket, wherein the intersecting pattern is tensioned to support at least one display element; and wherein the cap panel insert is removably coupled using at least one of: a friction-fit or press-fit configuration.

2. The method of claim 1, wherein configuring the cap panel insert to be removably coupled to the cap panel further comprises using at least one pocket shaped ridge capable of receiving at least a portion of the cap panel insert.

3. The method of claim 1, wherein configuring the cap panel insert to be removably coupled to the cap panel comprises configuring the cap panel insert to be removed from the casket and displayed outside of the casket.

4. The method of claim 1, wherein the plurality of elongate members comprise a plurality of resilient members.

5. The method of claim 4, wherein the plurality of resilient members comprises elastic straps, ribbon-shaped straps, or a combination thereof.

6. The method of claim 4, wherein arranging the plurality of resilient members comprises arranging the plurality of resilient members in a lattice arrangement, a grid arrangement, or a combination thereof.

7. The method of claim 1, further comprising arranging at least one mounting element on a second exposed surface of the cap panel insert opposite the first exposed surface, the at least one mounting element configured to allow the cap panel insert to be mounted on a surface outside of the casket.

8. The method of claim 1, wherein the cap panel insert comprises fabric material, filler material, and a backing board.

9. The method of claim 8, wherein the fabric material comprises cloth, linen, paper, or a combination thereof.

10. The method of claim 8, wherein the filler material comprises fiber, cotton, or a combination thereof.

11. The method of claim 8, wherein the backing board comprises wood, plastic, metal, or a combination thereof.

* * * * *